(12) United States Patent
Yu

(10) Patent No.: US 10,380,748 B2
(45) Date of Patent: Aug. 13, 2019

(54) METHOD AND APPARATUS FOR DETERMINING TO-BE-SUPERIMPOSED AREA OF IMAGE, SUPERIMPOSING IMAGE AND PRESENTING PICTURE

(71) Applicant: Baidu Online Network Technology (Beijing) Co., Ltd., Beijing (CN)

(72) Inventor: Shuping Yu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 15/549,081

(22) PCT Filed: Dec. 16, 2015

(86) PCT No.: PCT/CN2015/097585
§ 371 (c)(1),
(2) Date: Aug. 4, 2017

(87) PCT Pub. No.: WO2017/054327
PCT Pub. Date: Apr. 6, 2017

(65) Prior Publication Data
US 2018/0197302 A1 Jul. 12, 2018

(30) Foreign Application Priority Data
Sep. 29, 2015 (CN) .......................... 2015 1 0632207

(51) Int. Cl.
*G06T 7/33* (2017.01)
*G06F 16/29* (2019.01)
(Continued)

(52) U.S. Cl.
CPC ................ *G06T 7/33* (2017.01); *G01C 21/32* (2013.01); *G06F 16/29* (2019.01); *G06F 16/50* (2019.01);
(Continued)

(58) Field of Classification Search
CPC .. G06Q 30/02; G01C 21/32; G06F 17/30241; G06F 17/30244; G06F 17/30268; G06T 11/00; G06K 9/00704
(Continued)

(56) References Cited

U.S. PATENT DOCUMENTS

2007/0210937 A1  9/2007  Smith et al.
2008/0240513 A1  10/2008  Xie et al.
(Continued)

FOREIGN PATENT DOCUMENTS

CN   102543038 A   7/2012
CN   104596523 A   5/2015
(Continued)

*Primary Examiner* — Daniel G Mariam
(74) *Attorney, Agent, or Firm* — Seed IP Law Group LLP

(57) ABSTRACT

The present disclosure discloses a method and apparatus for determining a to-be-superimposed area of an image, superimposing an image and presenting a picture. The method for determining a to-be-superimposed area of an image in a scene picture comprises: acquiring a scene picture; determining a to-be-superimposed area in the scene picture; receiving a to-be-superimposed image based on a update request from a user, the update request including identity information of the to-be-superimposed image; and determining the to-be-superimposed area matching the to-be-superimposed image based on the identity information. The present embodiment realizes a partial update to the scene picture.

13 Claims, 7 Drawing Sheets

(51) Int. Cl.
  *G06F 16/50* (2019.01)
  *G06T 11/00* (2006.01)
  *G01C 21/32* (2006.01)
  *G06K 9/00* (2006.01)
  *G06T 11/60* (2006.01)
  *G06F 16/58* (2019.01)

(52) U.S. Cl.
  CPC ..... *G06F 16/5866* (2019.01); *G06K 9/00704* (2013.01); *G06T 11/00* (2013.01); *G06T 11/60* (2013.01)

(58) Field of Classification Search
  USPC .................................................. 382/215, 276
  See application file for complete search history.

(56) References Cited

U.S. PATENT DOCUMENTS

| | | | |
|---|---|---|---|
| 2010/0004995 A1* | 1/2010 | Hickman | G06Q 30/02 705/14.58 |
| 2014/0344671 A1 | 11/2014 | Wang et al. | |
| 2014/0372841 A1* | 12/2014 | Mohr | G06F 17/30831 715/201 |
| 2015/0002539 A1 | 1/2015 | Li et al. | |

FOREIGN PATENT DOCUMENTS

| | | |
|---|---|---|
| CN | 104657206 A | 5/2015 |
| CN | 104915432 A | 9/2015 |
| WO | 2010/005901 A2 | 1/2010 |

* cited by examiner

METHOD AND APPARATUS FOR DETERMINING TO-BE-SUPERIMPOSED AREA OF IMAGE, SUPERIMPOSING IMAGE AND PRESENTING PICTURE

CROSS-REFERENCE TO RELATED APPLICATION

This application claims the priority of Chinese Patent Application No. 201510632207.5, filed on Sep. 29, 2015, the content of which is incorporated herein by reference in its entirety.

BACKGROUND

Technical Field

The present disclosure relates to the field of computer technology, specifically to the field of Internet technology, and more specifically to a method and apparatus for determining a to-be-superimposed area of an image, superimposing an image and presenting a picture.

Description of the Related Art

Street view pictures provide users with great convenience in looking up for real geographic information. The real streets, buildings and other information in the street view allow the user to be able to learn about the real situation of the surroundings of the place she interests in without going out.

In the prior art, image information in a street view is static information collected at a certain moment, therefore the various portions in the street view images cannot be updated, added, or modified separately before the street scape is completely updated, leading to the result that the information contained in the street view image acquired by the user is obsolete and may not correspond to the practical situation.

BRIEF SUMMARY

The objective of the present disclosure is to provide an improved method and apparatus for determining a to-be-superimposed area of an image, superimposing an image and presenting a picture, in order to solve the technical problem mentioned in the foregoing Background section.

In a first aspect, the present disclosure provides a method for determining a to-be-superimposed area of an image in a scene picture, comprising: acquiring a scene picture; determining a to-be-superimposed area in the scene picture; receiving a to-be-superimposed image based on a update request from a user, the update request including identity information of the to-be-superimposed image; and determining the to-be-superimposed area matching the to-be-superimposed image based on the identity information.

In some embodiments, the determining a to-be-superimposed area in the scene picture comprises: dividing the scene picture into a plurality of candidate superimposed areas; selecting the candidate superimposed area as a to-be-superimposed area resulting from the candidate superimposed area meeting a predetermined condition; and adding identification information to the to-be-superimposed area.

In some embodiments, the identification information of the to-be-superimposed area comprises: geographical location information of the to-be-superimposed area, size information of the to-be-superimposed area and to-be-updated time information of the to-be-superimposed area; and the identity information of the to-be-superimposed image comprises: geographical location information of the to-be-superimposed image, size information of the to-be-superimposed image and to-be-updated time information of the to-be-superimposed image.

In some embodiments, the predetermined condition comprises: an expected update frequency of the candidate superimposed area is higher than a predetermined frequency.

In a second aspect, the present disclosure provides a method for superimposing an image in a scene picture, comprising: receiving identification information of a to-be-superimposed area in the scene picture, the identification information of the to-be-superimposed area including geographical location information of the to-be-superimposed area, size information of the to-be-superimposed area and to-be-updated time information of the to-be-superimposed area; and uploading a to-be-superimposed image to a server, based on identity information of the to-be-superimposed image matching the identification information of the to-be-superimposed area, the identity information of the to-be-superimposed image including geographical location information of the image, size information of the image and to-be-updated time information of the image.

In a third aspect, the present disclosure provides a method for presenting a scene picture, comprising: receiving a scene picture acquisition request of a user, the scene picture acquisition request including geographical location information of a to-be-requested scene picture; acquiring a first scene picture matching the scene picture acquisition request; adding a to-be-superimposed image matching a to-be-superimposed area to the to-be-superimposed area to form a second scene picture, based on the scene picture including the to-be-superimposed area; and presenting the second scene picture to the user.

In a fourth aspect, the present disclosure provides an apparatus for determining a to-be-superimposed area of an image in a scene picture, comprising: an acquisition module, configured to acquire a scene picture; a determining module, configured to determine a to-be-superimposed area in the scene picture; a receiving module, configured to receive a to-be-superimposed image based on a update request from a user, the update request including identity information of the to-be-superimposed image; and a matching module, configured to determine the to-be-superimposed area matching the to-be-superimposed image based on the identity information.

In some embodiments, the determining module is further configured to: divide the scene picture into a plurality of candidate superimposed areas; select the candidate superimposed area as a to-be-superimposed area resulting from the candidate superimposed area meeting a predetermined condition; and add identification information to the to-be-superimposed area.

In some embodiments, the identification information of the to-be-superimposed area comprises: geographical location information of the to-be-superimposed area, size information of the to-be-superimposed area and to-be-updated time information of the to-be-superimposed area; and the identity information of the to-be-superimposed image comprises: geographical location information of the to-be-superimposed image, size information of the to-be-superimposed image and to-be-updated time information of the to-be-superimposed image.

In some embodiments, the predetermined condition comprises: an expected update frequency of the candidate superimposing area is higher than a predetermined frequency.

In a fifth aspect, the present disclosure provides an apparatus for superimposing an image in a scene picture, comprising: a receiving module, configured to receive identification information of a to-be-superimposed area in the scene picture, the identification information of the to-be-superimposed area including geographical location information of the to-be-superimposed area, size information of the to-be-superimposed area and to-be-updated time information of the to-be-superimposed area; and an uploading module, configured to upload a to-be-superimposed image to a server, based on identity information of the to-be-superimposed image matching the identification information of the to-be-superimposed area, the identity information of the to-be-superimposed image including geographical location information of the image, size information of the image and to-be-updated time information of the image.

In a sixth aspect, the present disclosure provides an apparatus for presenting a scene picture, comprising: a receiving module, configured to receive a scene picture acquisition request of a user, the scene picture acquisition request including geographical location information of a to-be-requested scene picture; an acquisition module, configured to acquire a first scene picture matching the scene picture acquisition request; an adding module, configured to add a to-be-superimposed image matching a to-be-superimposed area to the to-be-superimposed area to form a second scene picture, based on the scene picture including the to-be-superimposed area; and a presenting module, configure to present the second scene picture to the user.

By determining a to-be-superimposed area in the scene picture, and adding a to-be-superimposed image matching the to-be-superimposed area in the to-be-superimposed area, the method and apparatus for determining a to-be-superimposed area of an image, superimposing an image and presenting a picture provided by the present disclosure can partially update a scene picture or superimpose an image in a scene picture to improve the update efficiency of the scene picture and to make the scene picture presented to the user more realistic.

BRIEF DESCRIPTION OF THE SEVERAL VIEWS OF THE DRAWINGS

Other features, objectives and advantages of the present disclosure will become more apparent upon reading the detailed description to non-limiting embodiments with reference to the accompanying drawings, wherein.

DETAILED DESCRIPTION

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
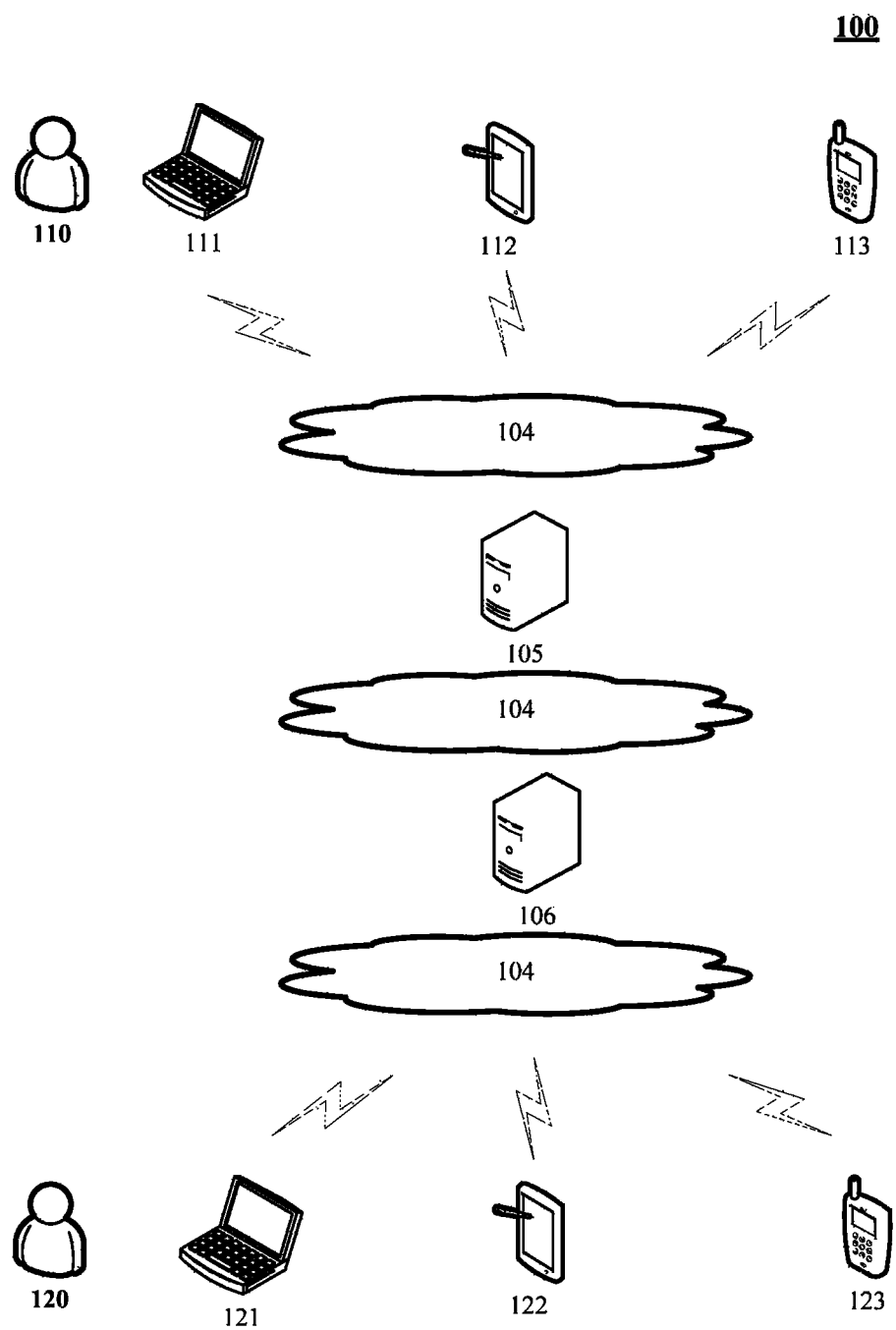
FIG. 1 is an exemplary system architecture diagram in which the present disclosure may be applied.

FIG. 1 shows an exemplary architecture of a system 100 which may be used by a method and apparatus for determining a to-be-superimposed area of an image in a scene picture according to an embodiment of the present application.

As shown in FIG. 1, the system architecture 100 may include a user 110 and terminal devices 111, 112 and 113, a network 104 and a server 105 corresponding to the user; and a user 120 and terminal devices 121, 122 and 123 corresponding to the user 120. The network 104 serves as a medium providing a communication link between the terminal devices 111, 112 and 113 of the user 110, the server 105, 106 and terminal devices 121, 122 and 123 of the user 120. The network 104 may include various types of connections, such as wired or wireless transmission links, or optical fibers.

The user 110 may interact with the server 105 to receive and/or send messages via the network 104.

Similarly, the user 120 may interact with the server 106 to receive and/or send messages by using the terminal devices 121, 122 and 123 via the network 104.

Similarly, the server 105 and the server 106 may interact with each other to receive and/or send messages via the network 104.

Various communication client applications, such as web browser applications, street view map applications, search applications, instant messaging tools, mailbox clients, social platform software, may be installed on the terminal devices 111, 112, 113 and terminal devices 121, 122 and 123.

The terminal devices 111, 112, 113 and terminal devices 121, 122 and 123 may be various electronic devices capable of interacting with the server, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The servers 105 and 106 may be servers providing various services, for example, street view map servers providing street view maps to the terminal devices 111, 112, 113 and/or terminal devices 121, 122 and 123, or image processing servers adding pictures to the related position of the street view map according to request from terminal devices 111, 112, 113 and/or terminal devices 121, 122 and 123.

It should be noted that the method for determining a to-be-superimposed area of an image in a scene picture according to the embodiments of the present application is generally executed by the servers 105 and 106, and accordingly, an apparatus for determining a to-be-superimposed area of an image in a scene picture is generally installed on the servers 105 and 106.

The method for determining a to-be-superimposed area of an image in a scene picture according to the embodiments of the present application may be executed by the terminal devices 111, 112, 113 and/or terminal devices 121, 122 and 123, and accordingly, an apparatus for determining a to-be-superimposed area of an image in a scene picture may be installed on the terminal devices 111, 112, 113 and/or terminal devices 121, 122 and 123.

The method for presenting a scene picture according to the embodiments of the present application is generally executed by the servers 105 and 106, and accordingly, an apparatus for presenting a scene picture is generally installed on the servers 105 and 106.

It should be appreciated that the numbers of the terminal devices, the networks and the servers in the virtual machine cluster in FIG. 1 are merely illustrative. Any number of terminal devices, networks and servers may be provided based on the actual requirements.

Figure 2:
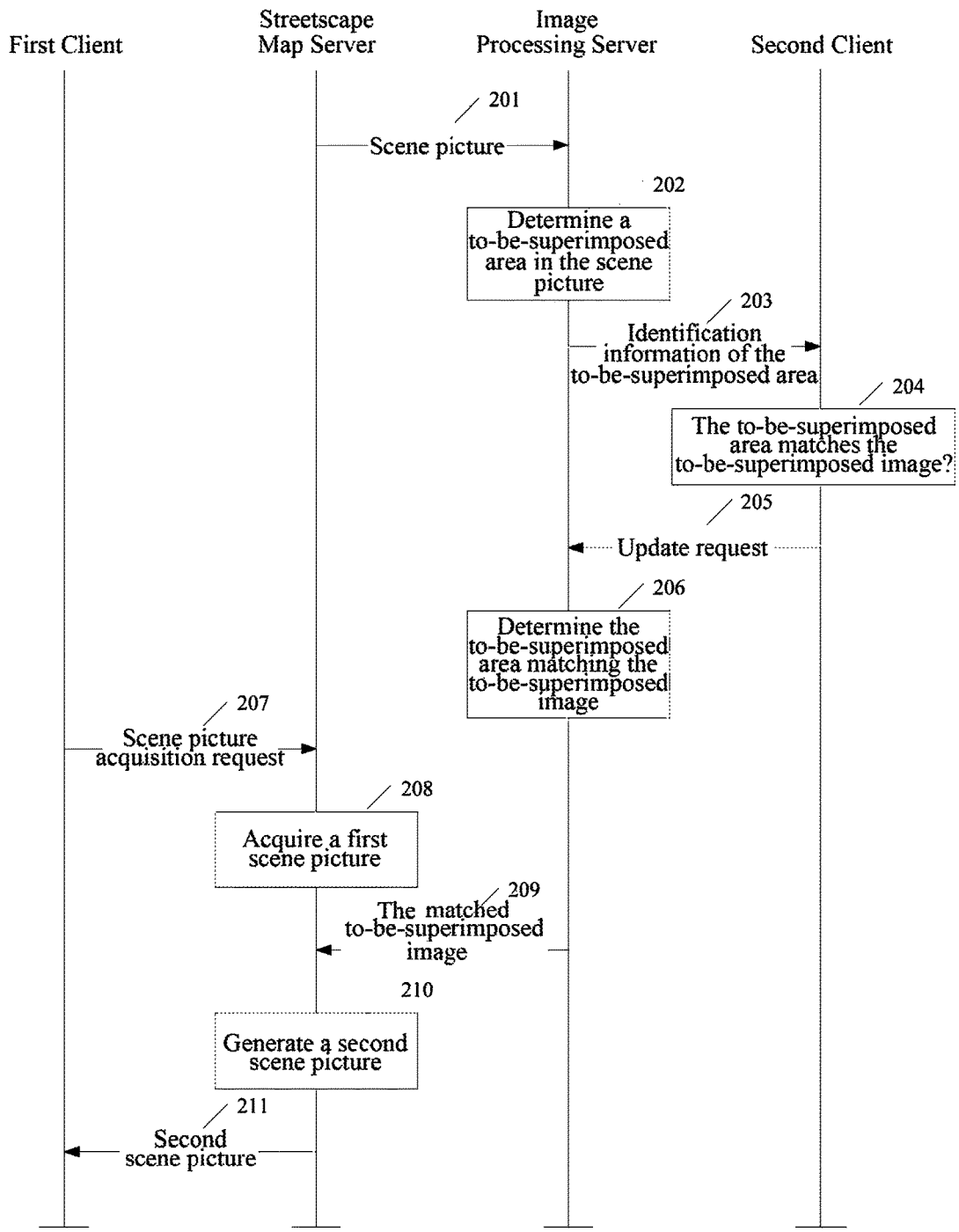
FIG. 2 is an example of an interactive process for determining a to-be-superimposed area of an image and superimposing an image in a scene picture, and presenting a scene picture after superimposing the image of embodiments of the present disclosure.

Referring to FIG. 2, is an example of an interactive process for determining a to-be-superimposed area of an image and superimposing an image in an scene picture, and presenting a scene picture after superimposing the image of embodiments of the present disclosure.

It should be understood by those skilled in the art that for purposes of example and ease of understanding, one or more specific technical details are set forth and described in the following description, but embodiments of the present disclosure may also be practiced without these features. In the embodiment shown in FIG. 2, an interaction between a first user, a streetscape map server, an image processing server and a second user is illustrated as an example.

Specifically, in step 201, the image processing server acquires a scene picture from the streetscape map server.

Typically, the streetscape map server may store a plurality of scene pictures. In some alternative implementations, each scene picture may have information that characterizes its geographic location (e.g., city, street, house number, or latitude and longitude).

Next, in step 202, the image processing server may determine a to-be-superimposed area in the acquired scene picture.

The image processing server may determine a to-be-superimposed area in the scene picture according to predetermined rules. For example, in some alternative implementations, the image processing server may identify streetscape objects (e.g., buildings, street lights and so on) contained in the scene picture, and determine the area in which these objects are located as the to-be-superimposed area.

Next, in step 203, a second client acquires identification information of the to-be-superimposed area.

Here, the identification information may be information that can determine the corresponding location of the to-be-superimposed area one by one.

Next, in step 204, the second client determines whether the to-be-superimposed area matches the to-be-superimposed image.

Here, the meaning of the word "match" may be, for example, that the to-be-superimposed area is suitable for adding these to-be-superimposed images.

Next, in step 205, if the to-be-superimposed area matches the to-be-superimposed image, the second client may send an update request to the image processing server.

In some alternative implementations, when the second client sends the update request to the image processing server, the to-be-superimposed image may also be together sent to the image processing server.

Next, in step 206, the image processing server determines the to-be-superimposed area matching the to-be-superimposed image.

In some application scenarios, as shown in step 204, the second client may be used to determine whether the to-be-superimposed area matches the to-be-superimposed image. Alternatively, in some other application scenarios, as shown in step 206, the image processing server may also determine whether the to-be-superimposed area matches the to-be-superimposed image. Alternatively, in some other application scenarios, the second client may first determine whether the to-be-superimposed area matches the to-be-superimposed image based on certain judging criteria and/or conditions, and then the image processing server further determines whether the to-be-superimposed area matches the to-be-superimposed image based on the same or different judging criteria and/or conditions as the second client.

Next, in step 207, when a first client needs to acquire the scene picture, it may send a scene picture acquisition request to the streetscape map server.

In some application scenarios, the streetscape map server may store a plurality of different scene pictures, but the first client only desires to acquire one or a part of the plurality of different scene pictures. Thus, in these application scenarios, the scene picture acquisition request sent by the first client may contain related information of the part of the scene pictures that the first client desires to acquire. That is, after receiving the scene picture acquisition request sent by the first client, the streetscape map server may find out these scene pictures that the first client desires to acquire in the area where all the scene pictures are stored (for example, in the database for storing the scene pictures) based on the scene picture acquisition request.

Next, in step 208, the streetscape map server acquires a first scene picture corresponding to the scene picture acquisition request sent by the first client. For example, in some application scenarios, the streetscape map server may search and acquire the corresponding first scene picture from the database storing the scene pictures based on the scene picture acquisition request sent by the first client.

Next, in step 209, the streetscape map server may acquire the to-be-superimposed image matching the first scene picture from the image processing server.

For example, in some application scenarios, the streetscape map server may acquire the to-be-superimposed image matching the first scene picture correspondingly from the image processing server based on related information of the first scene picture.

Next, in step 210, the streetscape map server generates a second scene picture based on the first scene picture and the to-be-superimposed image matching the first scene picture, and sends the second scene picture to the first client.

Through the interaction process as described above, when the first client requires to acquire a scene picture from the streetscape map server, the streetscape map server may determine whether there are areas to be updated (the to-be-superimposed areas) in the scene picture (the first scene picture), if affirmative, superimpose the corresponding images in these areas and generate a new scene picture (the second scene picture), and send the generated scene picture to the first client, thereby realizing the updating of parts of areas in the scene picture.

The interaction process of determining a to-be-superimposed area of an image, superimposing an image in a scene picture and presenting a scene picture after superimposing the image is described above. Next, the methods respectively performed by the image processing server, the second client, and the streetscape map server will be described respectively.

Figure 3:
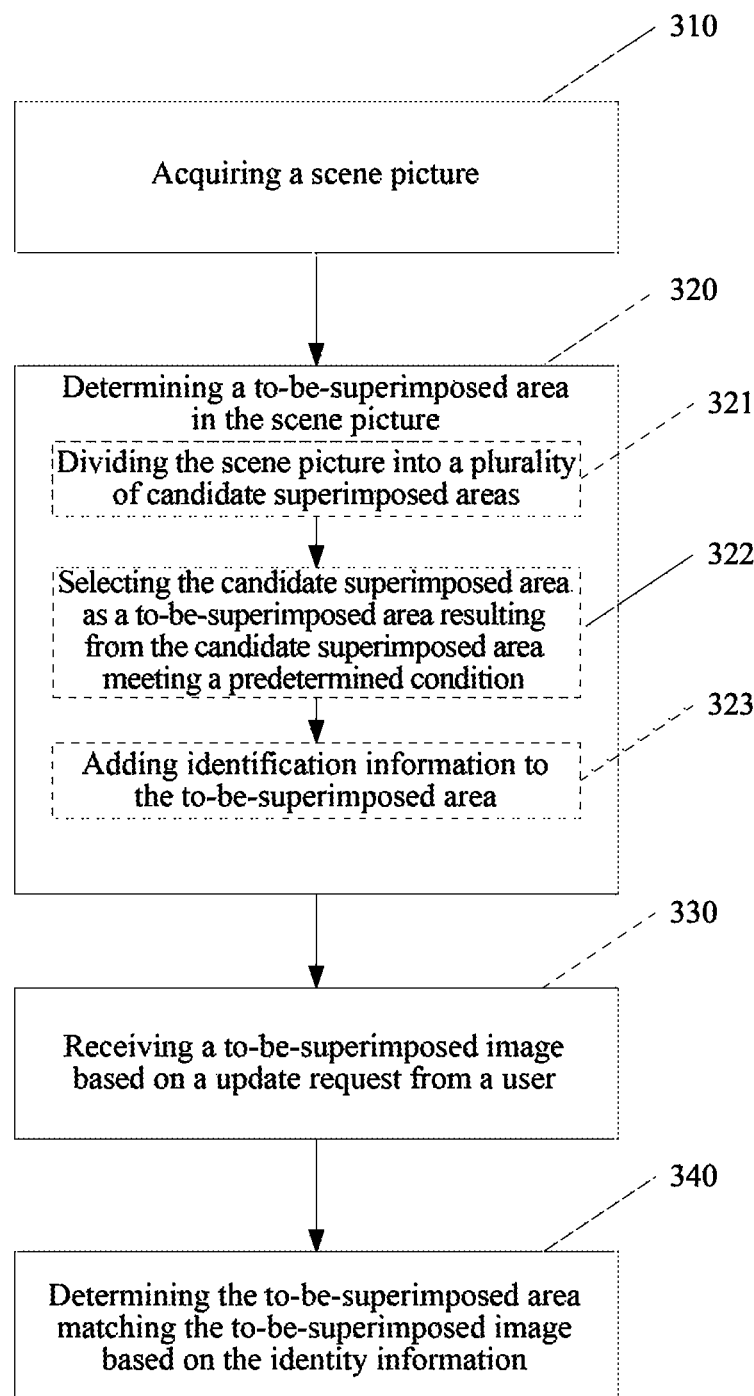
FIG. 3 is a schematic flowchart of a method for determining a to-be-superimposed area of an image in a scene picture of embodiments of the present disclosure.

FIG. 3 illustrates a schematic flowchart 300 of a method for determining a to-be-superimposed area of an image in a scene picture of embodiments of the present disclosure. In the present embodiment, an electronic device (e.g., the image processing server as illustrated in FIG. 2) on which the method for determining a to-be-superimposed area of an image in a scene picture operate may acquire, by means of wired connection or wireless connection, related information from the client and/or other servers (e.g., the streetscape map server as shown in FIG. 2). It should be noted that the wireless connection may include, but is not limited to, 3G/4G connection, WiFi connection, Bluetooth connection, WiMAX connection, Zigbee connection, UWB (ultra wideband) connection, and other wireless connections known by now or to be developed in the future.

In step 310, acquiring a scene picture. In some alternative implementations, for example, the scene picture may be acquired from a storage position storing the scene pictures (e.g., the database storing the scene pictures).

Next, in step 320, determining a to-be-superimposed area in the scene picture. In some alternative implementations, for example, the to-be-superimposed area in the scene picture may be determined by adopting a similar approach as that described in the above step 202.

Next, in step 330, receiving a to-be-superimposed image based on a update request from a user. Here, the update request includes identity information of the to-be-superimposed image.

Here, the user may be, for example, a user corresponding to the second client in FIG. 2.

Next, in step 340, determining the to-be-superimposed area matching the to-be-superimposed image based on the identity information.

In some alternative implementations, the determining a to-be-superimposed area in the scene picture in step 320 may be performed in the approach described below.

Specifically, in step 321, dividing the scene picture into a plurality of candidate superimposed areas. For example, in some alternative implementations, an image recognition technology may be adopted to divide the scene picture in accordance with the outline of each of the streetscape objects contained in the scene picture.

Next, in step 322, selecting the candidate superimposed area as a to-be-superimposed area resulting from the candidate superimposed area meeting a predetermined condition.

Next, in step 323, adding identification information to the to-be-superimposed area.

In some alternative implementations, the identification information of the to-be-superimposed area may include such as geographical location information of the to-be-superimposed area, size information of the to-be-superimposed area and to-be-updated time information of the to-be-superimposed area.

Similarly, the identity information of the to-be-superimposed image may include such as geographical location information of the to-be-superimposed image, size information of the to-be-superimposed image and to-be-updated time information of the to-be-superimposed image.

In some alternative implementations, the predetermined condition may include such as: an expected update frequency of the candidate superimposed area is higher than a predetermined frequency.

Figure 4:
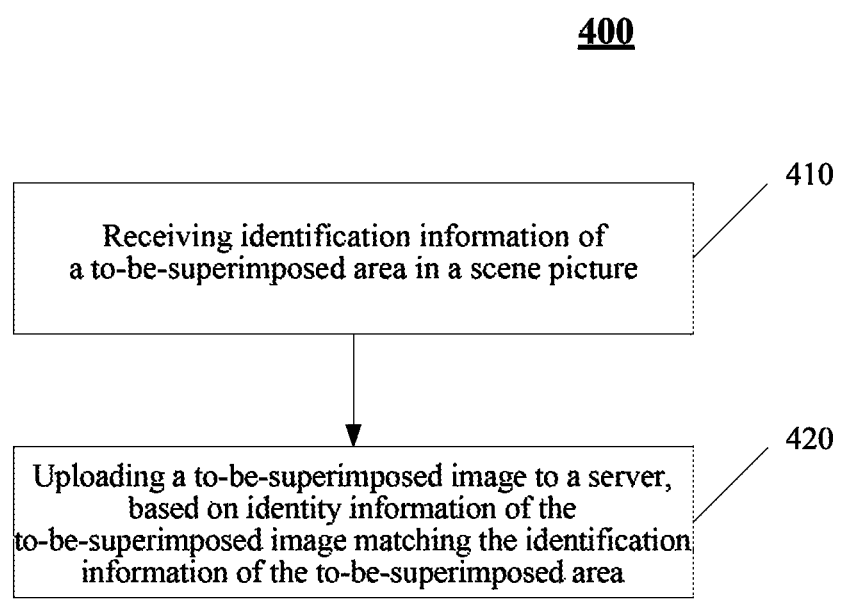
FIG. 4 is a schematic flowchart of a method for superimposing an image in an scene picture of embodiments of the present disclosure.

FIG. 4 is a schematic flowchart 400 of a method for superimposing an image in a scene picture of embodiments of the present disclosure. In some alternative implementations, the method for superimposing an image in a scene picture of the present embodiment may operate on a client (e.g., the second client in FIG. 2).

Specifically, in step 410, receiving identification information of a to-be-superimposed area in a scene picture. In some alternative implementations, the identification information of a to-be-superimposed area may include such as geographical location information of the to-be-superimposed area, size information of the to-be-superimposed area and to-be-updated time information of the to-be-superimposed area.

Next, in step 420, uploading a to-be-superimposed image to a server, based on identity information of the to-be-superimposed image matching the identification information of the to-be-superimposed area. In some alternative implementations, similar to the identification information of the to-be-superimposed area, the identity information of the to-be-superimposed image may also comprise geographical location information of the image, size information of the image and to-be-updated time information of the image.

Figure 5:
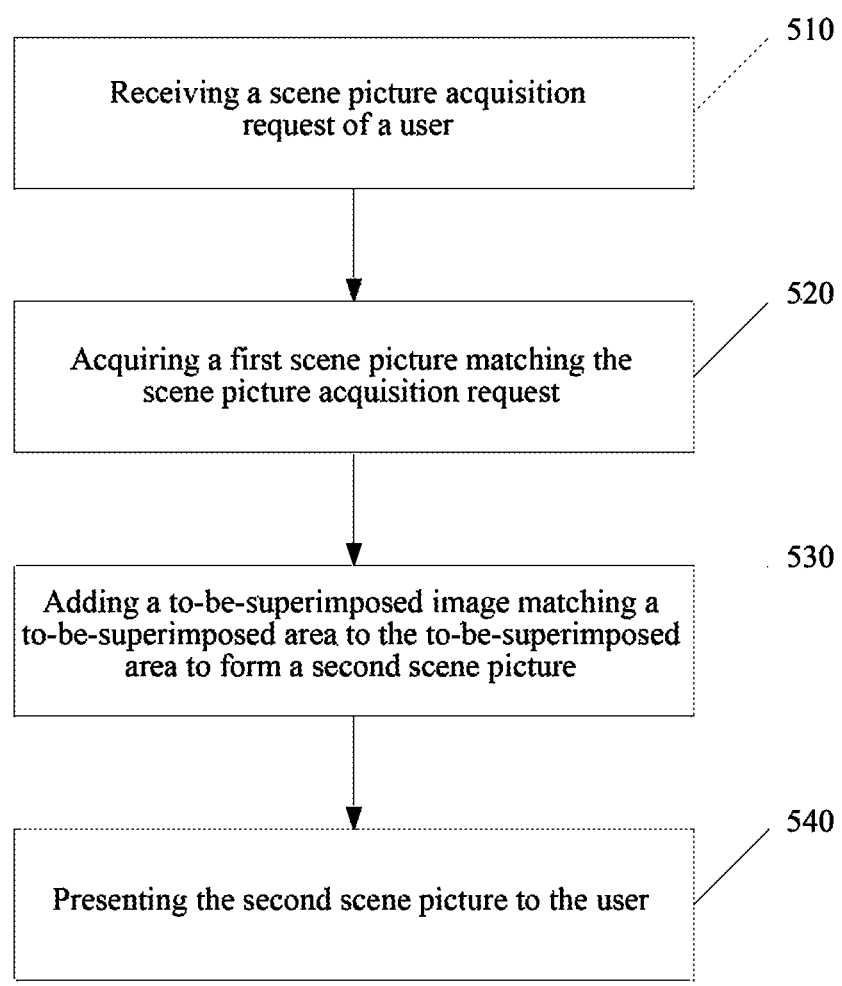
FIG. 5 is a schematic flowchart of a method for presenting a scene picture of embodiments of the present disclosure.

FIG. 5 is a schematic flowchart 500 of a method for presenting a scene picture of embodiments of the present disclosure. In some alternative implementations, the method for presenting a scene picture of the present embodiment may be operate on a server (e.g., the streetscape map server in FIG. 2).

Specifically, in step 510, receiving a scene picture acquisition request of a user. Here, the scene picture acquisition request includes geographical location information of a to-be-requested scene picture.

Next, in step 520, acquiring a first scene picture matching the scene picture acquisition request.

Next, in step 530, adding a to-be-superimposed image matching a to-be-superimposed area to the to-be-superimposed area to form a second scene picture, based on the scene picture including the to-be-superimposed area.

Next, in step 540, presenting the second scene picture to the user (e.g., the user corresponding to the first client in FIG. 2).

Therefore, in some application scenarios, when a user requires to acquire a scene picture, if part of the image is updated in the scene picture, the server may add the part of updated image to the corresponding location in the scene picture, and present the superimposed scene picture to the user.

Figure 6:
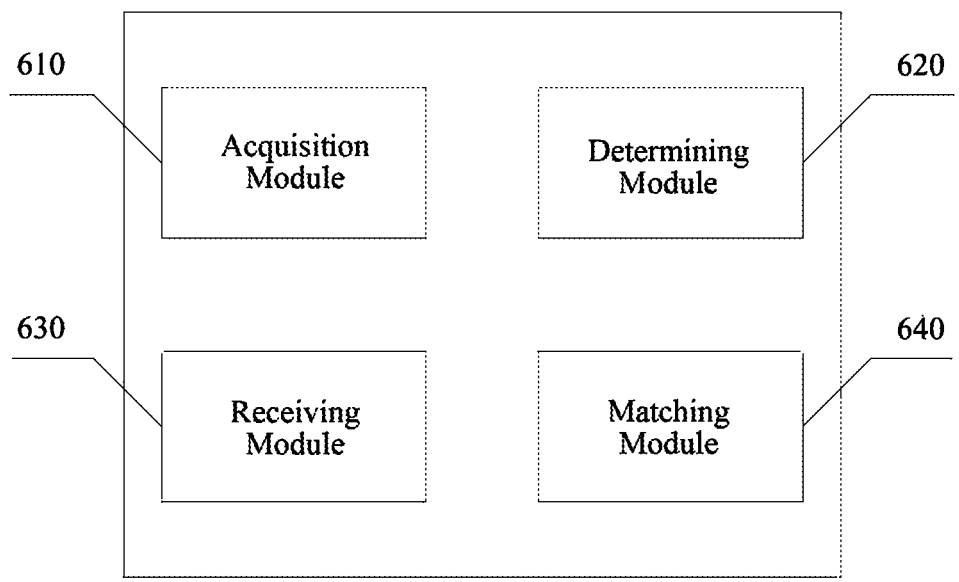
FIG. 6 is a schematic structural diagram of an apparatus for determining a to-be-superimposed area of an image in a scene picture of embodiments of the present disclosure.

FIG. 6 is a schematic structural diagram 600 of an apparatus for determining a to-be-superimposed area of an image in a scene picture of embodiments of the present disclosure.

As shown in FIG. 6, the apparatus for determining a to-be-superimposed area of an image in a scene picture includes an acquisition module 610, a determining module 620, a receiving module 630 and a matching module 640.

Here, the acquisition module 610 is configured to acquire a scene picture.

The determining module 620 is configured to determine a to-be-superimposed area in the scene picture.

The receiving module 630 is configured to receive a to-be-superimposed image based on a update request from a user. In some alternative implementations, the update request may include such as identity information of the to-be-superimposed image.

The matching module 640 is configured to determine the to-be-superimposed area matching the to-be-superimposed image based on the identity information.

In some alternative implementations, the determining module 620 is further configured to: divide the scene picture into a plurality of candidate superimposed areas; select the candidate superimposed area as a to-be-superimposed area resulting from the candidate superimposed area meeting a predetermined condition; and add identification information to the to-be-superimposed area.

In alternative implementations, the identification information of the to-be-superimposed area may include such as geographical location information of the to-be-superimposed area, size information of the to-be-superimposed area and to-be-updated time information of the to-be-superimposed area.

Similarly, the identity information of the to-be-superimposed image may include such as geographical location information of the to-be-superimposed image, size information of the to-be-superimposed image and to-be-updated time information of the to-be-superimposed image.

In some alternative implementations, the predetermined condition may include such as an expected update frequency of the candidate superimposed area is higher than a predetermined frequency.

Figure 7:
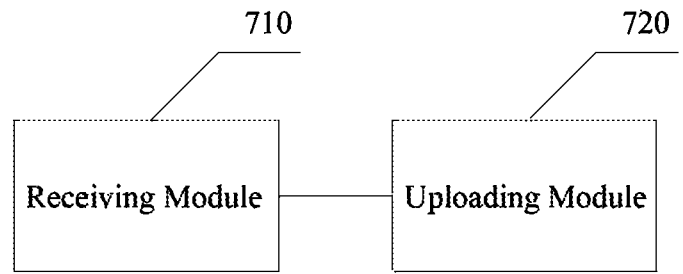
FIG. 7 is a schematic structural diagram of an apparatus for superimposing an image in a scene picture of embodiments of the present disclosure.

FIG. 7 is a schematic structural diagram 700 of an apparatus for superimposing an image in a scene picture of embodiments of the present disclosure.

As shown in FIG. 7, the apparatus for superimposing an image in a scene picture may include a receiving module 710 and an uploading module 720.

Here, the receiving module 710 may be configured to receive identification information of a to-be-superimposed area in the scene picture. In some alternative implementations, the identification information of the to-be-superimposed area includes geographical location information of the to-be-superimposed area, size information of the to-be-superimposed area and to-be-updated time information of the to-be-superimposed area.

The uploading module 720 is configured to upload a to-be-superimposed image to a server, based on identity information of the to-be-superimposed image matching the identification information of the to-be-superimposed area. In some alternative implementations, the identity information of the to-be-superimposed image includes geographical location information of the image, size information of the image and to-be-updated time information of the image.

Figure 8:
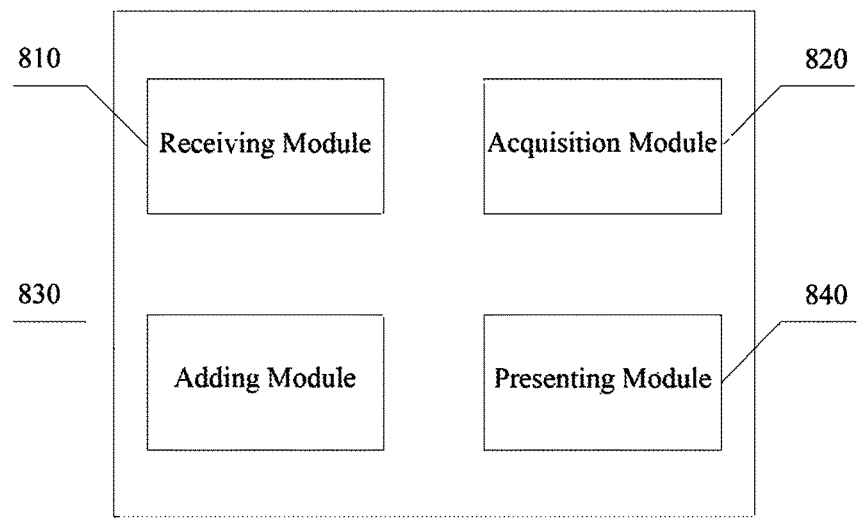
FIG. 8 is a schematic structural diagram of an apparatus for presenting a scene picture of embodiments of the present disclosure.

FIG. 8 is a schematic structural diagram 800 of an apparatus for presenting a scene picture of embodiments of the present disclosure.

As shown in FIG. 8, the apparatus for presenting a scene picture may include a receiving module 810, an acquisition module 820, an adding module 830 and a presenting module 840.

Here, the receiving module 810 is configured to receive a scene picture acquisition request of a user. In some alternative implementations, the scene picture acquisition request may include such as geographical location information of a to-be-requested scene picture.

The acquisition module 820 is configured to acquire a first scene picture matching the scene picture acquisition request.

The adding module 830 is configured to add a to-be-superimposed image matching a to-be-superimposed area to the to-be-superimposed area to form a second scene picture, based on the scene picture including the to-be-superimposed area.

The presenting module 840 is configure to present the second scene picture to the user.

Figure 9:
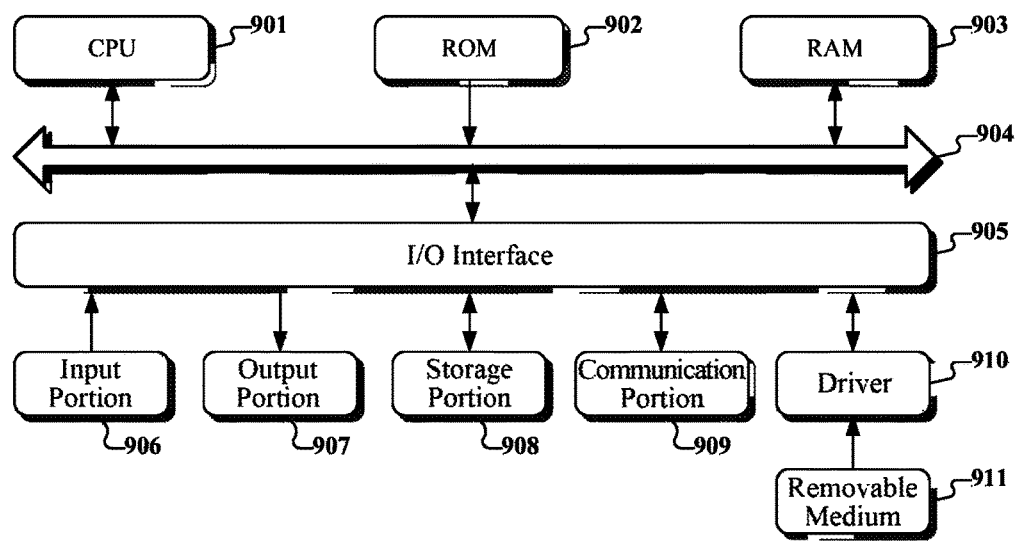
FIG. 9 is a schematic structural diagram of a computer system adapted to implement a terminal device or a server according to embodiments of the present disclosure.

Referring to FIG. 9, a schematic structural diagram of a computer system 900 adapted to implement a server of the embodiments of the present application is shown.

As shown in FIG. 9, the computer system 900 includes a central processing unit (CPU) 901, which may execute various appropriate actions and processes in accordance with a program stored in a read-only memory (ROM) 902 or a program loaded into a random access memory (RAM) 903 from a storage portion 908. The RAM 903 also stores various programs and data required by operations of the system 900. The CPU 901, the ROM 902 and the RAM 903 are connected to each other through a bus 904. An input/output (I/O) interface 905 is also connected to the bus 904.

The following components are connected to the I/O interface 905: an input portion 906 including a keyboard, a mouse etc.; an output portion 907 comprising a cathode ray tube (CRT), a liquid crystal display device (LCD), a speaker etc.; a storage portion 908 including a hard disk and the like; and a communication portion 909 comprising a network interface card, such as a LAN card and a modem. The communication portion 909 performs communication processes via a network, such as the Internet. A driver 910 is also connected to the I/O interface 905 as required. A removable medium 911, such as a magnetic disk, an optical disk, a magneto-optical disk, and a semiconductor memory, may be installed on the driver 910, to facilitate the retrieval of a computer program from the removable medium 911, and the installation thereof on the storage portion 908 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 909, and/or may be installed from the removable media 911.

The flowcharts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising an acquisition module, a determining module, a receiving unit and a matching module, where the names of these units or modules are not considered as a limitation to the units or modules. For example, the acquisition unit may also be described as "a unit for acquiring a scene picture."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: acquire a scene picture; determine a to-be-superimposed area in the scene picture; receive a to-be-superimposed image based on a update request from a user, the update request including identity information of the to-be-superimposed image; and determine the to-be-superimposed area matching the to-be-superimposed image based on the identity information.

The present application provides a non-transitory computer storage medium storing one or more programs, when the one or more programs being executed by the a device, the device performs: receive identification information of a to-be-superimposed area in the scene picture, the identification information of the to-be-superimposed area including geographical location information of the to-be-superimposed area, size information of the to-be-superimposed area and to-be-updated time information; and upload a to-be-superimposed image to a server, resulting from identity information of the to-be-superimposed image matching the identification information of the to-be-superimposed area, the identity information of the to-be-superimposed image including geographical location information of the image, size information of the image and to-be-updated time information of the image The present application provides a non-transitory computer storage medium storing one or more programs, when the one or more programs being executed by the a device, the device performs: receive a scene picture acquisition request of a user, the scene picture acquisition request including geographical location information of a to-be-requested scene picture; acquire a first scene picture matching the scene picture acquisition request; add a to-be-superimposed image matching a to-be-superimposed area to the to-be-superimposed area to form a second scene picture, according to the first scene picture including the to-be-superimposed area; and present the second scene picture to the user.

In some embodiments, the determining a to-be-superimposed area in the scene picture comprises: dividing the scene picture into a plurality of candidate superimposed areas; selecting a candidate superimposed area as a to-be-superimposed area resulting from the candidate superimposed area meeting a predetermined condition; and adding identification information to the to-be-superimposed area.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the disclosure, such as, technical solutions formed by replacing the features as disclosed in the present application with (but not limited to), technical features with similar functions.

What is claimed is:

1. A method for determining a to-be-superimposed area of an image in a scene picture, comprising:
   acquiring a scene picture;
   determining a to-be-superimposed area in the scene picture, comprising identifying streetscape objects contained in the scene picture, dividing the scene picture in accordance with an outline of each of the streetscape objects to obtain candidate superimposed areas, and determining the candidate superimposed area meeting a predetermined condition as the to-be-superimposed area;
   receiving a to-be-superimposed image based on an update request from a user, the update request including identity information of the to-be-superimposed image; and
   determining the to-be-superimposed area matching the to-be-superimposed image based on the identity information.

2. The method according to claim 1, wherein the determining a to-be-superimposed area in the scene picture comprises:
   adding identification information to the to-be-superimposed area.

3. The method according to claim 2, wherein:
   the identification information of the to-be-superimposed area comprises: geographical location information of the to-be-superimposed area, size information of the to-be-superimposed area and to-be-updated time information of the to-be-superimposed area; and
   the identity information of the to-be-superimposed image comprises: geographical location information of the to-be-superimposed image, size information of the to-be-superimposed image and to-be-updated time information of the to-be-superimposed image.

4. The method according to claim 2, wherein the predetermined condition comprises:
   an expected update frequency of the candidate superimposed area being higher than a predetermined frequency.

5. A method for superimposing an image in a scene picture, comprising:
   receiving identification information of a to-be-superimposed area in the scene picture, the identification information of the to-be-superimposed area including geographical location information of the to-be-superimposed area, size information of the to-be-superimposed area and to-be-updated time information of the to-be-superimposed area, wherein the to-be-superimposed area is determined by identifying streetscape objects contained in the scene picture, dividing the scene picture in accordance with an outline of each of the streetscape objects to obtain candidate superimposed areas, and determining the candidate superimposed area meeting a predetermined condition as the to-be-superimposed area; and
   uploading a to-be-superimposed image to a server, resulting from identity information of the to-be-superimposed image matching the identification information of the to-be-superimposed area, the identity information of the to-be-superimposed image including geographical location information of the image, size information of the image and to-be-updated time information of the image.

6. A method for presenting a scene picture, comprising:
receiving a scene picture acquisition request of a user, the scene picture acquisition request including geographical location information of a to-be-requested scene picture;
acquiring a first scene picture matching the scene picture acquisition request;
adding a to-be-superimposed image matching a to-be-superimposed area to the to-be-superimposed area to form a second scene picture, according to the first scene picture including the to-be-superimposed area, wherein the to-be-superimposed area is determined by identifying streetscape objects contained in the first scene picture, dividing the first scene picture in accordance with an outline of each of the streetscape objects to obtain candidate superimposed areas, and determining the candidate superimposed area meeting a predetermined condition as the to-be-superimposed area; and
presenting the second scene picture to the user.

7. An apparatus for determining a to-be-superimposed area of an image in a scene picture, comprising:
at least one processor; and
a memory storing instructions, which when executed by the at least one processor, cause the at least one processor to perform operations, the operations comprising:
acquiring a scene picture;
determining a to-be-superimposed area in the scene picture, comprising identifying streetscape objects contained in the scene picture, and dividing the scene picture in accordance with an outline of each of the streetscape objects to obtain candidate superimposed areas, determining the candidate superimposed area meeting a predetermined condition as the to-be-superimposed area;
receiving a to-be-superimposed image based on a update request from a user, the update request including identity information of the to-be-superimposed image; and
determining the to-be-superimposed area matching the to-be-superimposed image based on the identity information.

8. The apparatus according to claim 7, wherein the determining a to-be-superimposed area in the scene picture comprises:
adding identification information to the to-be-superimposed area.

9. The apparatus according to claim 8, wherein:
the identification information of the to-be-superimposed area comprises: geographical location information of the to-be-superimposed area, size information of the to-be-superimposed area and to-be-updated time information of the to-be-superimposed area; and
the identity information of the to-be-superimposed image comprises: geographical location information of the to-be-superimposed image, size information of the to-be-superimposed image and to-be-updated time information of the to-be-superimposed image.

10. The apparatus according to claim 8, wherein the predetermined condition comprises:
an expected update frequency of the candidate superimposed area being higher than a predetermined frequency.

11. An apparatus for superimposing an image in a scene picture, comprising:
at least one processor; and
a memory storing instructions, which when executed by the at least one processor, cause the at least one processor to perform operations, the operations comprising:
receiving identification information of a to-be-superimposed area in the scene picture, the identification information of the to-be-superimposed area including geographical location information of the to-be-superimposed area, size information of the to-be-superimposed area and to-be-updated time information of the to-be-superimposed area, wherein the to-be-superimposed area is determined by identifying streetscape objects contained in the scene picture, dividing the scene picture in accordance with an outline of each of the streetscape objects to obtain candidate superimposed areas, and determining the candidate superimposed area meeting a predetermined condition as the to-be-superimposed area; and
uploading a to-be-superimposed image to a server, based on identity information of the to-be-superimposed image matching the identification information of the to-be-superimposed area, the identity information of the to-be-superimposed image including geographical location information of the image, size information of the image and to-be-updated time information of the image.

12. An apparatus for presenting a scene picture, comprising:
at least one processor; and
a memory storing instructions, which when executed by the at least one processor, cause the at least one processor to perform operations, the operations comprising:
receiving a scene picture acquisition request of a user, the scene picture acquisition request including geographical location information of a to-be-requested scene picture;
acquiring a first scene picture matching the scene picture acquisition request;
adding a to-be-superimposed image matching a to-be-superimposed area to the to-be-superimposed area to form a second scene picture, based on the scene picture including the to-be-superimposed area, wherein the to-be-superimposed area is determined by identifying streetscape objects contained in the first scene picture, dividing the first scene picture in accordance with an outline of each of the streetscape objects to obtain candidate superimposed areas, and determining the candidate superimposed area meeting a predetermined condition as the to-be-superimposed area; and
presenting the second scene picture to the user.

13. A non-transitory computer storage medium storing computer-readable instructions executable by a processor, the instructions, when executed by the processor, causing the processor to perform operations, the operations comprising:
acquiring a scene picture;
determining a to-be-superimposed area in the scene picture, comprising identifying streetscape objects contained in the scene picture, and dividing the scene picture in accordance with an outline of each of the streetscape objects to obtain candidate superimposed areas, determining the candidate superimposed area meeting a predetermined condition as the to-be-superimposed area;

receiving a to-be-superimposed image based on a update request from a user, the update request including identity information of the to-be-superimposed image; and determining the to-be-superimposed area matching the to-be-superimposed image based on the identity information.

* * * * *